July 3, 1934.　　　　　G. A. LYON　　　　　1,965,532
SINGLE PIECE METAL TIRE COVER
Filed Oct. 2, 1931
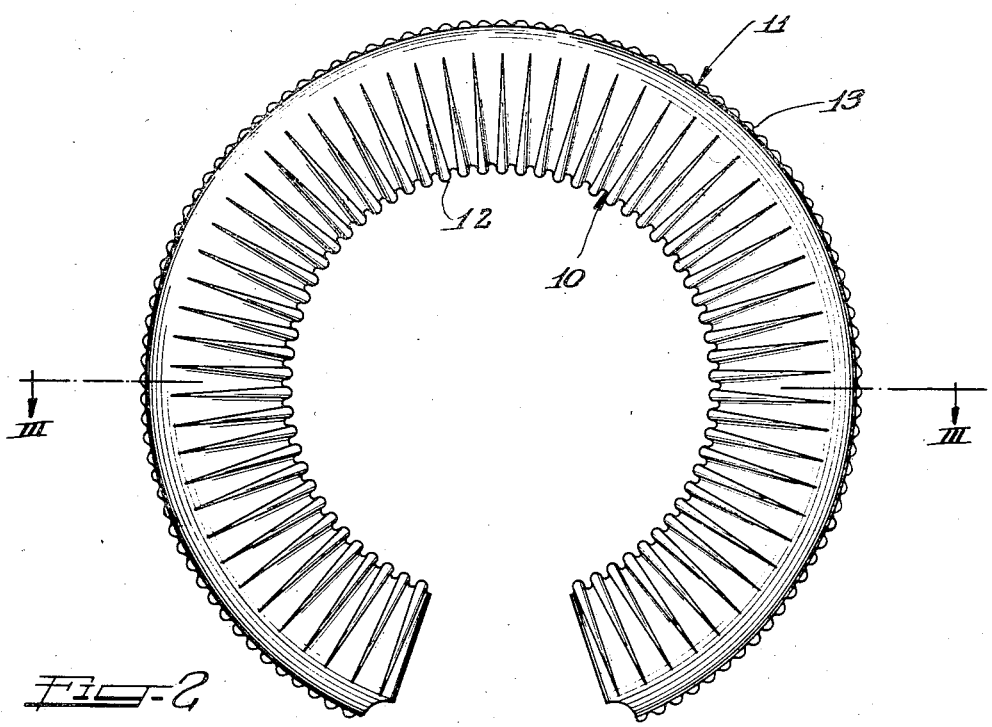
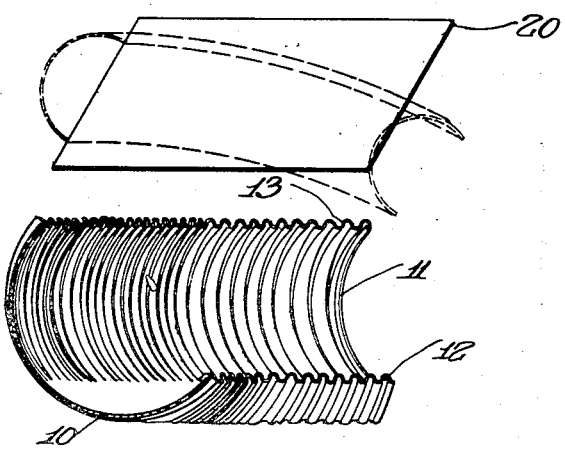
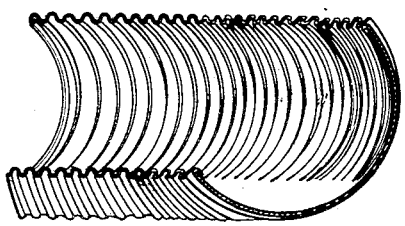
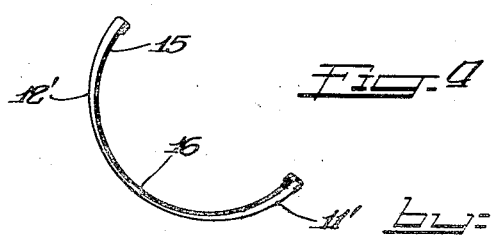
Inventor:
George Albert Lyon
by: Charles Hill
Attys.

Patented July 3, 1934

1,965,532

UNITED STATES PATENT OFFICE 1,965,532

SINGLE PIECE METAL TIRE COVER

George Albert Lyon, Allenhurst, N. J., assignor to Lyon Incorporated, Asbury Park, N. J., a corporation of Delaware Application October 2, 1931, Serial No. 566,452

4 Claims. (Cl. 150—54)

My present invention relates to metallic tire covers and more particularly to a unitary one-piece metallic cover adapted to be flexed over and onto a spare tire with a minimum amount of effort.

The aim of this invention is to provide an improved single piece metallic cover of simplified and inexpensive form and of such construction that it may be flexed onto and over a spare tire into proper tire protecting position thereon with a minimum amount of effort on the part of the person applying the same thereto.

In accordance with the general features of this invention, there is provided a single piece metallic tire cover including a side portion for covering an outer side wall of the tire and a peripheral portion for disposition over the outer periphery or tread of the tire, both of these portions being integral and corrugated.

Another feature of the invention relates to the provision of corrugations in the tire cover which corrugations may or may not extend continuously from the side portion of the cover up to and across the peripheral portion of the cover.

Still another feature of my invention relates to the provision of a corrugated split ring-like cover which may be rolled from a single strip of material with a minimum number of fabricating operations.

Other objects and features of this invention will more fully appear from the following detail description taken in connection with the accompanying drawing which illustrates several embodiments thereof, and in which Figure 1 is a side view of a single piece split metallic cover embodying the features of this invention.

Figure 2 is a fragmentary view of a strip of material showing the manner in which the cover may be rolled from the same.

Figure 3 is a transverse section taken on substantially the line III—III of Figure 1 looking in the direction indicated by the arrows.

Figure 4 is a cross-sectional view through a modified form of the cover in which the corrugations extend clear through both the side and peripheral portions of the cover.

The tire cover of my invention comprises a single piece metallic split ring which includes a side portion for disposition over an outer side wall of a spare tire and a peripheral portion for disposition over the outer periphery or tread of the spare tire, these portions being designated by the reference numerals 10 and 11 respectively. Each of these portions is corrugated and the corrugations in the portion 10 are designated by the reference numeral 12, whereas the corrugations in the portion 11 are designated by the reference numeral 13. It will be noted that these corrugations are radial in character and are of greatest depth at their outermost extremities. Furthermore, it will be noted from Figure 3 that the corrugations in the preferred form of the invention are not continuous, or, in other words, the corrugations in one portion do not extend clear across into the corrugations of the other portion as is the case in the modified form of the invention shown in Figure 4.

In the modified form of the invention shown in Figure 4, which is a cross-sectional view taken through a cover, the tread covering portion is designated by the numeral 12' and the side portion is designated by the numeral 11'. These two portions are provided with continuous transverse corrugations extending throughout the circumferential length of the cover. The corrugations are designated by the reference numeral 15. Also, it will be noted that each of these corrugations is of a greater depth at its outer extremities than it is at its mid-section as shown at 16.

The corrugations in these two forms of my invention provide the cover with flexibility whereby the cover may be expanded over and contracted onto a spare tire. In mounting the cover on a spare tire, one of the free ends of the cover is first disposed over the tire and the other end is then flexed outwardly or expanded whereby the cover may be progressively pressed into proper tire protecting position on the tire. In other words, after one end of the cover is placed over the tire, the cover may be completely applied to the tire by merely flexing the other end of the cover whereby it may be snapped into proper tire protecting position.

The corrugated feature of this single metallic cover not only enables the cover to be flexed over the spare tire but greatly enhances the appearance of the cover and presents a construction which is adapted to readily blend with the other appointments of the vehicle carrying the same.

Once the tire cover has been flexed into proper tire protecting position on the tire it is held against lateral displacement from the tire by the inherent resiliency of the cover as well as by the rear edge of the peripheral portion of the tire which is adapted to engage over the rear side of the tread of the tire. In this regard, it must be appreciated that the peripheral portion of the cover is of such transverse curvature that it provides an inwardly extending rear edge at its rear side of such depth as to permit of its being flexed over the tire into engagement with the rear side of the tread of the tire and yet at the same time be capable of holding the cover against lateral displacement from the tire once the cover is properly disposed on the tire. Needless to say, if it were not for this inwardly extending rear edge of the peripheral portion of the cover, the cover would be readily displaceable laterally from the tire.

The corrugations of my cover are a very essential feature of the cover since without these corrugations it would not be feasible to flex a cover of this shape and construction over a tire into tire protecting position thereon. The corrugations provide the cover with additional resiliency whereby the stiff metallic sheet may be flexed to a sufficient extent to permit of the mounting of the cover on the tire.

This cover of my invention readily adapts itself for manufacturing purposes since it may be fabricated with a minimum number of operations and hence with a minimum amount of manufacturing costs. I propose manufacturing this cover from a single strip of metallic material or some equivalent relatively stiff sheet such as is designated in Figure 2 by the reference character 20. The cover may be fabricated from this strip or sheet 20 by a rolling process in which the strip is not only curved longitudinally into a ring-like form, but is also curved transversely into a shape corresponding with the transverse cross-section of my cover, as will be evidenced from the dotted lines as shown in Figure 2. In the rolling of this cover the corrugations may be applied thereto by suitable corrugating rolls such as are well known in the industry.

Now, I desire it understood that although I have illustrated and described in detail several forms of my invention the invention is not to be thus limited but only insofar as defined by the scope and spirit of the appended claims.

I claim as my invention:

1. As an article of manufacture, a unitary single piece cover formed to be snapped over a spare tire into proper tire protecting position thereon, comprising a split ring having a side portion for disposition over an outer side wall of the tire and a peripheral portion for disposition over the outer periphery of the tire, both of which portions are provided with alternate transverse ridges and grooves to permit of flexing of the cover onto the tire.

2. As an article of manufacture, a unitary single piece metallic cover formed to be snapped over a spare tire into proper tire protecting position thereon, comprising a split ring having a side portion for disposition over an outer side wall of the tire and a peripheral portion for disposition over the outer periphery of the tire, both of which portions are corrugated to permit of flexing of the cover onto the tire, said corrugations being radially formed in the metal comprising said portions.

3. As an article of manufacture, a unitary single piece cover formed to be snapped over a spare tire into proper tire protecting position thereon, comprising a split ring having a side portion for disposition over an outer side wall of the tire and a peripheral portion for disposition over the outer periphery of the tire, both of which portions are transversely corrugated to permit of flexing of the cover onto the tire, each of said corrugations being of maximum width at its outermost extremity.

4. As an article of manufacture, a unitary single piece metallic cover formed to be snapped over a spare tire into proper tire protecting position thereon, comprising a split ring having a side portion for disposition over an outer side wall of the tire and a peripheral portion for disposition over the outer periphery of the tire, both of which portions are corrugated to permit of flexing of the cover onto the tire, said corrugations in said portions being transversely continuous but being of a minimum depth at the junction of said portions.

GEORGE ALBERT LYON.